United States Patent
Takeno et al.

(10) Patent No.: US 10,427,524 B2
(45) Date of Patent: Oct. 1, 2019

(54) PANEL APPARATUS

(71) Applicant: DENSO TEN Limited, Kobe-shi, Hyogo (JP)

(72) Inventors: Kiyoshi Takeno, Kobe (JP); Yuta Yamagami, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 73 days.

(21) Appl. No.: 15/832,304

(22) Filed: Dec. 5, 2017

(65) Prior Publication Data
US 2018/0215265 A1 Aug. 2, 2018

(30) Foreign Application Priority Data

Feb. 2, 2017 (JP) ................................ 2017-017802

(51) Int. Cl.
| | |
|---|---|
| B60K 37/02 | (2006.01) |
| B62D 25/14 | (2006.01) |
| B60K 35/00 | (2006.01) |
| B60K 37/00 | (2006.01) |
| B60K 37/04 | (2006.01) |
| B60R 11/02 | (2006.01) |
| B60R 11/00 | (2006.01) |

(52) U.S. Cl.
CPC .............. *B60K 37/02* (2013.01); *B60K 35/00* (2013.01); *B60K 37/00* (2013.01); *B60K 37/04* (2013.01); *B60R 11/0235* (2013.01); *B62D 25/14* (2013.01); *B60K 2370/81* (2019.05); *B60K 2370/816* (2019.05); *B60K 2370/84* (2019.05); *B60R 2011/0005* (2013.01); *B60R 2011/0047* (2013.01)

(58) Field of Classification Search
CPC ........ B60K 37/02; B60K 35/00; B60K 37/00; B60K 37/04; B62D 25/14
See application file for complete search history.

(56) References Cited

U.S. PATENT DOCUMENTS

| | | | |
|---|---|---|---|
| 5,873,749 A * | 2/1999 | Takiguchi ............. | B60K 37/00 174/72 A |
| 6,502,888 B2 * | 1/2003 | Inoue .................... | B60K 37/00 180/90 |
| 6,520,532 B2 * | 2/2003 | Kobayashi ........... | B60R 21/205 280/728.2 |

(Continued)

FOREIGN PATENT DOCUMENTS

| | | |
|---|---|---|
| JP | 2016-011019 A | 1/2016 |
| JP | 2017-114331 A | 6/2017 |

*Primary Examiner* — Faye M Fleming
(74) *Attorney, Agent, or Firm* — Oliff PLC (57) ABSTRACT

The panel includes a claw having (i) a base end that protrudes from a back surface of the panel in a different direction from an installation direction of the panel to the base, and (ii) an insertion member that protrudes from the base end in the installation direction. The installation direction is a direction in which the panel is moved when the panel is installed to the base. The base includes an insertion hole into which the insertion member of the panel is inserted, and a protrusion located adjacent to the insertion hole. When the insertion member and the base end of the claw are inserted into the insertion hole to install the panel to the base, the protrusion of the base is sandwiched and positioned between the insertion member and the back surface of the panel, and the base end of the claw is locked in the insertion hole.

16 Claims, 8 Drawing Sheets

(56) References Cited

U.S. PATENT DOCUMENTS

| | | | | |
|---|---|---|---|---|
| 6,666,413 B2 * | 12/2003 | Nakajima | .............. | B60K 35/00 |
| | | | | 248/27.1 |
| 8,474,214 B2 * | 7/2013 | Dawe | .................. | F16B 5/0664 |
| | | | | 24/289 |
| 2018/0236873 A1 * | 8/2018 | Nguyen | ................ | B60K 37/02 |

* cited by examiner

PANEL APPARATUS

BACKGROUND OF THE INVENTION

Field of the Invention

The invention relates to a panel apparatus and a method of assembling the panel apparatus.

Description of the Background Art

Conventionally, various technologies to install an on-vehicle device, for example, a display device or the like on an instrument panel of a vehicle have been known. In the on-vehicle device, the panel apparatus is provided on a part to form an appearance on a cabin side.

A panel apparatus according to a conventional technology includes, for example, a panel which has an operation surface or the like operated by a user and a base on which the panel is installed. For example, while a claw that protrudes in an installation direction to the base is formed on the panel, a hole is formed in the base. In the conventional technology, the panel is positioned and fixed relative to the base by inserting the claw of the panel into the hole of the base so as to be locked.

However, if the panel apparatus is configured by the conventional technology, for example, in a case where it is assumed that a direction along the installation direction is a front-back direction, since the panel, relative to the base, is positioned in the front-back direction but is not positioned in an up-down direction, misalignment and rattles or the like may be caused. As mentioned above, there is room for improvement in improving positioning capability of the panel to the base.

SUMMARY OF THE INVENTION

According to one aspect of the invention, a panel apparatus includes a base and a panel that is removably installed to the base. The panel includes a claw having (i) a base end that protrudes from a back surface of the panel in a different direction from an installation direction of the panel to the base, and (ii) an insertion member that protrudes from the base end in the installation direction. The installation direction is a direction in which the panel is moved when the panel is installed to the base. The base includes an insertion hole into which the insertion member of the panel is inserted, and a protrusion located adjacent to the insertion hole. When the insertion member and the base end of the claw are inserted into the insertion hole to install the panel to the base, the protrusion of the base is sandwiched and positioned between the insertion member and the back surface of the panel, and the base end of the claw is locked in the insertion hole.

According to another aspect of the invention, in the panel apparatus, the base includes an elastically deformable plate in which the insertion hole is located. The plate is elastically deformed from an initial shape when the plate is pressed by the base end of the claw when the insertion member and the base end of the claw are being inserted into the insertion hole, and when insertion of the insertion member and the base end of the claw into the insertion hole is completed, the plate is no longer pressed by the base end and returns to the initial shape to lock the base end in the insertion hole.

Therefore, an object of the invention is to improve positioning capability of the panel relative to the base.

These and other objects, features, aspects and advantages of the invention will become more apparent from the following detailed description of the invention when taken in conjunction with the accompanying drawings.

DESCRIPTION OF THE EMBODIMENTS

In the following, an embodiment of a panel apparatus and a method of assembling the panel apparatus disclosed in the application will be described in detail with reference to the accompanying figures. The invention is not limited to the embodiment described in the following.

<1. Outline of Panel Apparatus>

Figure 1:
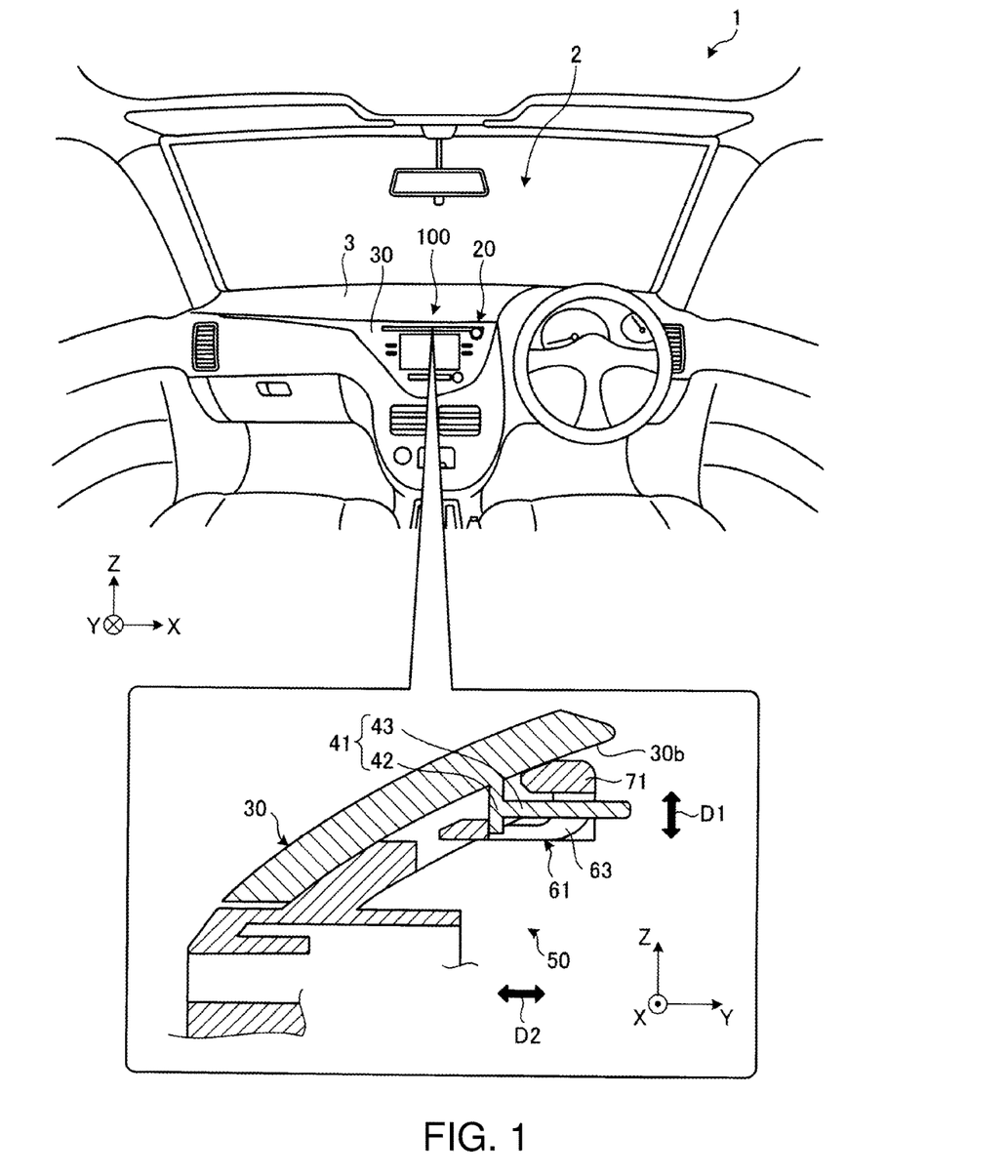
FIG. 1 is a diagram illustrating an outline of a panel apparatus according to an embodiment.
Figure 2:
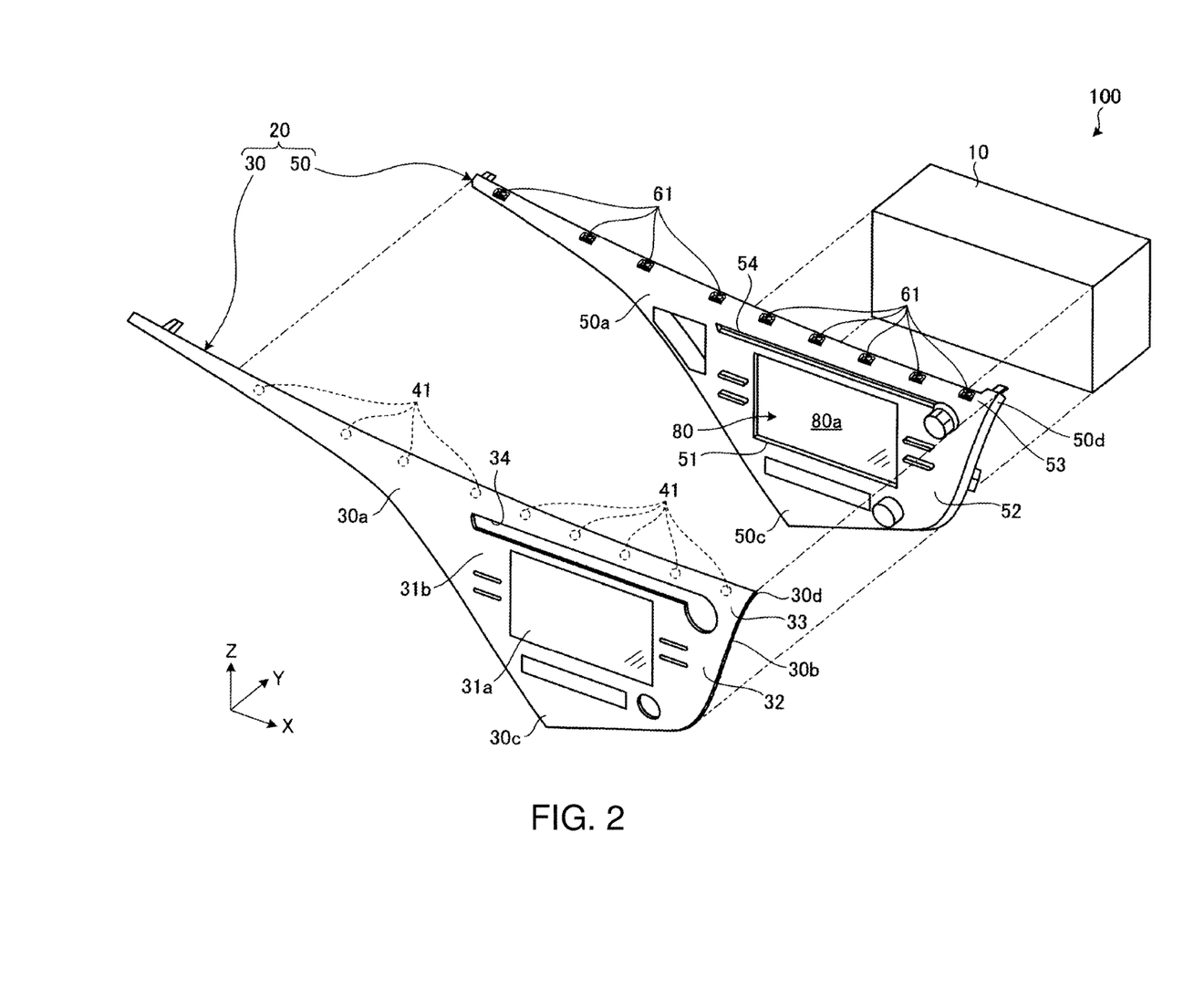
FIG. 2 is an exploded perspective view of a display system including the panel apparatus.

First, description will be made on an outline of the panel apparatus according to the embodiment using FIG. 1. FIG. 1 is a diagram illustrating the outline of the panel apparatus according to the embodiment. An upper part of FIG. 1 is a diagram when viewed from inside a cabin 2 of a vehicle 1 toward a front direction of the vehicle 1. FIG. 1, FIG. 2 and subsequent figures are all schematic diagrams.

In the upper part of FIG. 1, a three-dimensional orthogonal coordinate system that includes a Z axis whose vertically upward direction is positive and whose vertically downward direction is negative, an X axis as a vehicle width direction, and a Y axis as a vehicle length direction is shown for explanatory convenience. Such an orthogonal coordinate system may be shown in other figures used in the following description.

As illustrated in the upper part of FIG. 1, a panel apparatus 20 according to this embodiment is, for example, used for an on-vehicle device such as a display apparatus and an audio apparatus, and is provided on a part to form an appearance on a side of the cabin 2.

The on-vehicle device on which the panel apparatus 20 is provided is not limited to the display apparatus and the like described above, and may be other on-vehicle device including an instrument such as a meter, a speaker apparatus or the like. In this embodiment, a display system 100 includes the panel apparatus 20, but such a display system 100 will be described later using FIG. 2.

The panel apparatus 20 is placed on an instrument panel 3 that is located on a front side of the cabin 2. The panel apparatus 20 is, for example in the instrument panel 3, placed in a position between a driver seat and a passenger seat, but the position of the panel apparatus 20 is not limited thereto and can be changed as appropriate according to a type of the vehicle 1.

The panel apparatus 20 includes a panel 30 and a base 50 (not seen in the upper part of FIG. 1, refer to FIG. 2). The panel 30 is a design panel to form the appearance. The base 50 is placed on a side of a back surface of the panel 30 and the panel 30 is installed on the base 50. Shapes or the like of the panel 30 and the base 50 will be described later with reference to FIG. 2 and subsequent figures.

A lower part of FIG. 1 is an enlarged vertical section showing a part of the panel 30 that is installed on the base 50. In an example shown in the lower part of FIG. 1, it is assumed that a Y-axis positive direction is a direction in which the panel 30 is installed on the base 50. In the following, the Y-axis positive direction that is an installation direction, a Y-axis negative direction and a Y axis direction along the installation direction may be described as a "front direction", a "back direction" and a "front-back direction", respectively.

The panel 30 includes a claw 41. The claw 41 is provided on a side of a back surface 30b of the panel 30 and has a substantially L shape in a vertical section as illustrated in the lower part of FIG. 1.

Specifically, the claw 41 includes a base end 42 and an insertion member 43. The base end 42 is configured to protrude from the back surface 30b of the panel 30 in a different direction from the Y-axis positive direction which is an installation direction to the base 50. Here, the base end 42 is configured to protrude in a Z-axis negative direction (the vertically downward direction) from the back surface 30b of the panel 30.

The insertion member 43 is configured to protrude in the Y-axis positive direction which is an installation direction to the base 50 from the base end 42.

The base 50 includes a hole part 61 and a protrusion part 71. The hole part 61 has an insertion hole 63 into which the insertion member 43 of the panel 30 can be inserted. The protrusion part 71 is adjacently provided on a side of a Z-axis positive direction relative to the insertion hole 63.

In the panel apparatus 20 according to this embodiment, while the panel 30 includes the claw 41, the base 50 includes the hole part 61 and the protrusion part 71. Thus, it is possible to improve positioning capability of the panel 30 relative to the base 50.

Specifically, in a state in which the panel 30 is installed on the base 50, the insertion member 43 and the base end 42 of the claw 41 are inserted into the insertion hole 63 of the hole part 61. At this time, the protrusion part 71 on a side of the base 50 is sandwiched and positioned between the insertion member 43 on a side of the panel 30 and the back surface 30b of the panel 30. The base end 42 of the claw 41 on the side of the panel 30 is locked in the insertion hole 63 on the side of the base 50.

As described above, since the protrusion part 71 is sandwiched and positioned between the insertion member 43 and the back surface 30b of the panel 30, a movement of the panel 30 in an up-down direction (the Z-axis direction, refer to an arrow D1) and an front direction (the Y-axis positive direction) is controlled by the protrusion part 71. As a result, it is possible to position and fix the panel 30 relative to the base 50 in the front direction as well as the up-down direction.

Furthermore, since the base end 42 of the claw 41 on the side of the panel 30 is locked in the insertion hole 63 on the side of the base 50, a movement of the panel 30 in the back direction (the Y-axis negative direction) is controlled. As a result, it is possible to position and fix the panel 30 relative to the base 50 in the back direction.

That is, the protrusion part 71 is sandwiched and positioned between the insertion member 43 and the back surface 30b of the panel 30 and the base end 42 is locked in the insertion hole 63 so that it is possible to position and fix the panel 30 relative to the base 50 in the front-back direction (the Y-axis direction, refer to an arrow D2).

As described above, in this embodiment, it is possible to position the panel 30 relative to the base 50 not only in one direction of the front-back direction, as in the conventional technology, but also in the up-down direction. That is, it is possible to position the panel 30 in two directions of the front-back direction and the up-down direction. Thus, it is possible to improve positioning capability of the panel 30 relative to the base 50.

Furthermore, in this embodiment, it is possible to effectively suppress misalignment or rattles of the panel 30 relative to the base 50 due to improvement of positioning capability of the panel 30 relative to the base 50.

<2. Specific Configuration of Panel Apparatus>

Next, a detailed configuration of the panel apparatus 20 and the like according to the embodiment will be described with reference to FIG. 2 and subsequent figures. FIG. 2 is an exploded perspective view of the display system 100 including the panel apparatus 20.

As illustrated in FIG. 2, the display system 100 includes a body part 10, the panel apparatus 20 and a display part 80.

The body part 10 includes various components of a playback apparatus (not illustrated) such as a digital versatile disk (DVD) and a compact disc (CD), a central processing unit (CPU, not illustrated) that performs overall control of the on-vehicle device or the like, and is placed inside the instrument panel 3 (refer to FIG. 1). FIG. 2 schematically shows the body part 10 in a rectangular parallelepiped block shape.

The display part 80 includes a display screen 80a, for example, a liquid crystal panel or the like. The display screen 80a displays various information such as a DVD video, route information or the like. The display part 80 is housed in the base 50 of the panel apparatus 20.

The panel apparatus 20, as described above, includes the panel 30 and the base 50. The panel 30 is made of resin, but is not limited thereto.

The panel 30 is, for example, formed into a thin plate shape, and includes a plane part 32 and a curved part 33. For example, the plane part 32 is formed into a plane shape along the Z-axis positive direction from a lower end part 30c of the panel 30.

The curved part 33 is continuously formed from the plane part 32 and, for example, is curved so as to protrude into a side of a front surface 30a in a vicinity of an upper end part 30d of the panel 30. As described above, the panel 30 has at least a part that is curved so as to protrude into the side of the front surface 30a. However, the shape of the panel 30 is not limited to the shape shown in the figure.

The front surface 30a of the panel 30 is zoned into a display area 31a and a non-display area 31b. The display area 31a is formed in a position facing the display screen 80a of the display part 80. The display area 31a is, for example, transparent and is formed to have translucency. As a result, a user can visually recognize information displayed on the display screen 80a of the display part 80 via the display area 31a of the panel 30.

The non-display area 31b is an area other than the display area 31a and, for example, is decorated with a black color or the like and formed so as to have a light-blocking effect. The panel 30 is, for example, provided with an electrostatic capacitive sensor on a side of the back surface 30b and may be a touch panel that detects a contact position relative to the display area 31a for the user.

An opening 34 to insert, for example, the DVD or the like into the playback apparatus is formed in the panel 30. The opening 34 is, for example, formed in the plane part 32 of the panel 30. Specifically, the opening 34 is formed in a position close to the curved part 33, in the plane part 32. The position of the opening 34 can be arbitrarily changed.

A plurality of the claws 41 are provided on the back surface 30b of the panel 30. Since each of the claws 41 is not seen in FIG. 2, a position of the claw 41 is surrounded by a closed curve with a broken line. A number of the claw 41 is not limited to the number illustrated in FIG. 2 and can be arbitrarily set.

Figure 3:
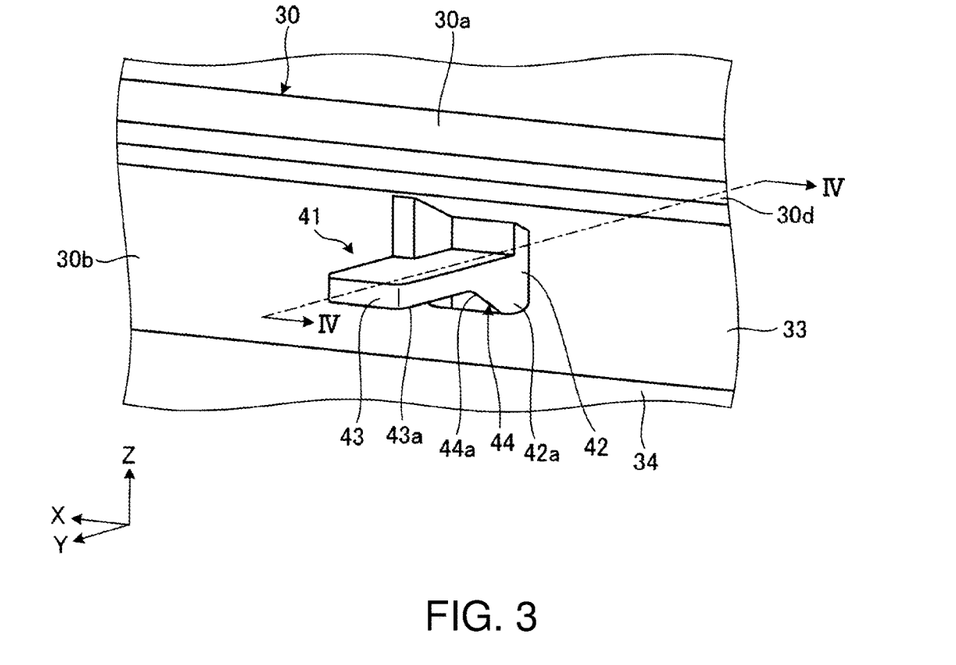
FIG. 3 is an enlarged perspective view of a vicinity of a claw when viewed from a side of a back surface of a panel.
Figure 4:
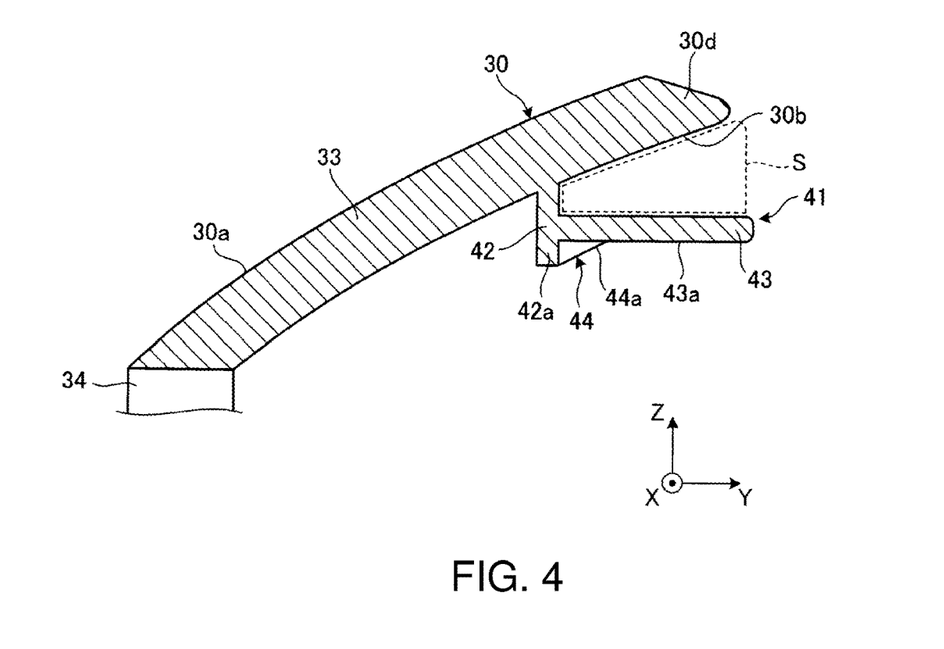
FIG. 4 is a cross-sectional view taken along line IV-IV shown in FIG. 3.

FIG. 3 is an enlarged perspective view of a vicinity of the claw 41 when viewed from the side of the back surface 30b of the panel 30. FIG. 4 is a cross-sectional view taken along line IV-IV shown in FIG. 3

As illustrated in FIG. 3 and FIG. 4, the claw 41 includes the base end 42, the insertion member 43 and an inclined part 44. The base end 42 is, for example, formed into a plate shape and is configured to protrude in the Z-axis negative direction from the back surface 30b of the panel 30. The base end 42 is integrally formed with the panel 30, but is not limited thereto. The base end 42 may be separately formed from the panel 30.

The insertion member 43 is also formed into a plate shape. The insertion member 43 is configured to protrude in the installation direction (the Y-axis positive direction) from a position higher than a lower end part 42a of the base end 42 by only a predetermined distance. As a result, as illustrated in FIG. 4, a space S is created among the insertion member 43, the back surface 30b of the panel 30 and the base end 42. When the panel 30 is installed on the base 50, the protrusion part 71 on the side of the base 50 is inserted into the space S so as to be sandwiched between the insertion member 43 and the back surface 30b of the panel 30.

The inclined part 44 includes an inclined surface 44a. The inclined surface 44a is, for example, configured to connect the lower end part 42a of the base end 42 and an appropriate position of a lower surface 43a of the insertion member 43. The inclined surface 44a is a surface that inclines in the installation direction.

Returning to FIG. 2, the claws 41 configured as described above, for example, are provided in a vicinity of the curved part 33 of the panel 30. As a result, it is possible to effectively suppress misalignment or rattles of the panel 30 relative to the base 50.

That is, the vicinity of the curved part 33 of the panel 30 is a part that is gently curved so as to extend in a horizontal direction from the plane part 32 extending in a vertical direction. Thus, an external force in the front-back direction or the up-down direction is easily applied, for example, due to a touch of the user or the like. When the external force in the front-back direction or the up-down direction is applied, misalignment or rattles of the vicinity of the curved part 33 relative to the base 50 are easily caused.

Therefore, in this embodiment, the claws 41 are provided in the vicinity of the curved part 33 of the panel 30 so that the panel 30 is installed on the base 50 in the vicinity of the curved part 33. In this embodiment, since it is possible to position and fix the panel 30 relative to the base 50 in the front-back direction and the up-down direction by the claws 41 and the like, it is possible to effectively suppress misalignment or rattles of the vicinity of the curved part 33 relative to the base 50.

Furthermore, although a space between the panel 30 and the base 50 is relatively small in the vicinity of the curved part 33 on the side of the back surface 30b of the panel 30, since the claws 41 are smaller than a member for installation, for example, a bolt, a nut or the like, the claws 41 can be provided even in a small space on the side of the back surface 30b of the panel 30.

Some of the plurality of the claws 41 are provided in a vicinity of the opening 34 of the panel 30. As a result, it is possible to effectively suppress misalignment or rattles of the panel 30 relative to the base 50.

That is, since rigidity in the vicinity of the opening 34 of the panel 30 is lower compared to a case in which the opening 34 is not provided, the panel 30 is easily bent in the vicinity of the opening 34 so that misalignment or rattles relative to the base 50 are easily caused.

Therefore, in this embodiment, the claws 41 are provided in the vicinity of the opening 34 of the panel 30 so that the panel 30 is installed on the base 50 in the vicinity of the opening 34. In this embodiment, since it is possible to position and fix the panel 30 relative to the base 50 in the front-back direction and the up-down direction by the claws 41 and the like, it is possible to effectively suppress misalignment or rattles of the vicinity of the opening 34 relative to the base 50.

Subsequently, description will be made on the base 50. The base 50 is made of resin, but is not limited thereto. The base 50 is fixed on a vehicle body inside the instrument panel 3, but is not necessarily required to be fixed on the vehicle body at a point of time at which the panel 30 is installed. That is, the base 50 may be fixed on the vehicle body after the panel 30 is installed.

The base 50 is, for example, formed into a thin plate shape, and a front surface 50a is configured to correspond to a shape of the panel 30. Specifically, the base 50 includes a plane part 52 and a curved part 53 in the same manner as the panel 30.

The plane part 52 is, for example, formed into a plane shape along the Z-axis positive direction from a lower end part 50c of the base 50. The curved part 53 is continuously formed from the plane part 52 and, for example, is curved so as to protrude into a side of the front surface 50a in a vicinity of an upper end part 50d of the base 50.

An opening 51 is provided in the base 50. The opening 51 is formed in a position facing the display screen 80a of the display part 80. Therefore, the display part 80 is housed in the base 50 in a state in which the display screen 80a is exposed through the opening 51.

Furthermore, in the base 50, an opening 54 is provided in a position that corresponds to the opening 34 on the side of the panel 30. Therefore, for example, the DVD is inserted from the opening 34 on the side of the panel 30 into the playback apparatus via the opening 54 on the side of the base 50.

In the base 50, a plurality of the hole parts 61 are provided in positions that correspond to the claws 41 on the side of the panel 30. Specifically, the hole parts 61 are provided in a vicinity of the curved part 53 on a side of the upper end part 50d of the base 50.

Figure 5:
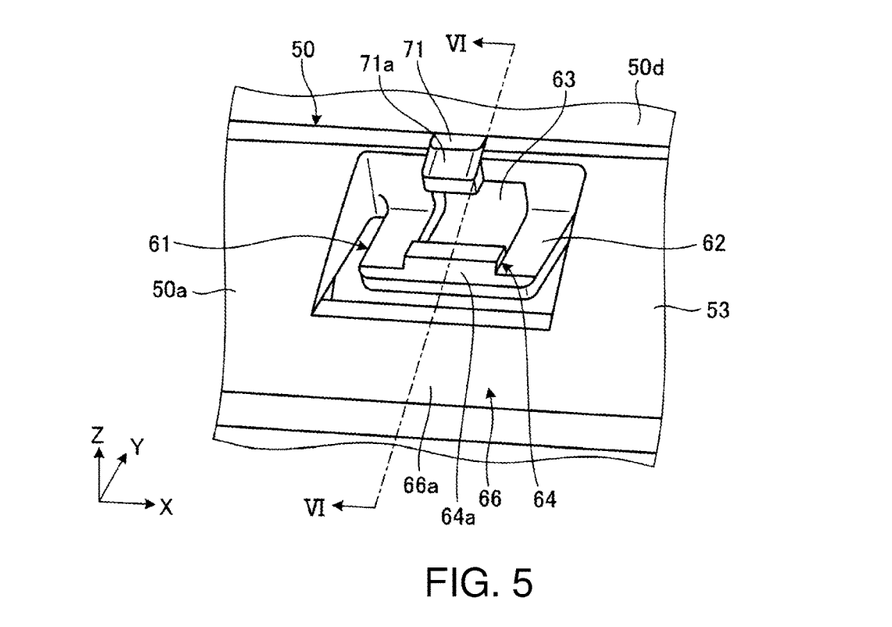
FIG. 5 is an enlarged perspective view of a vicinity of a hole part of a base.
Figure 6:
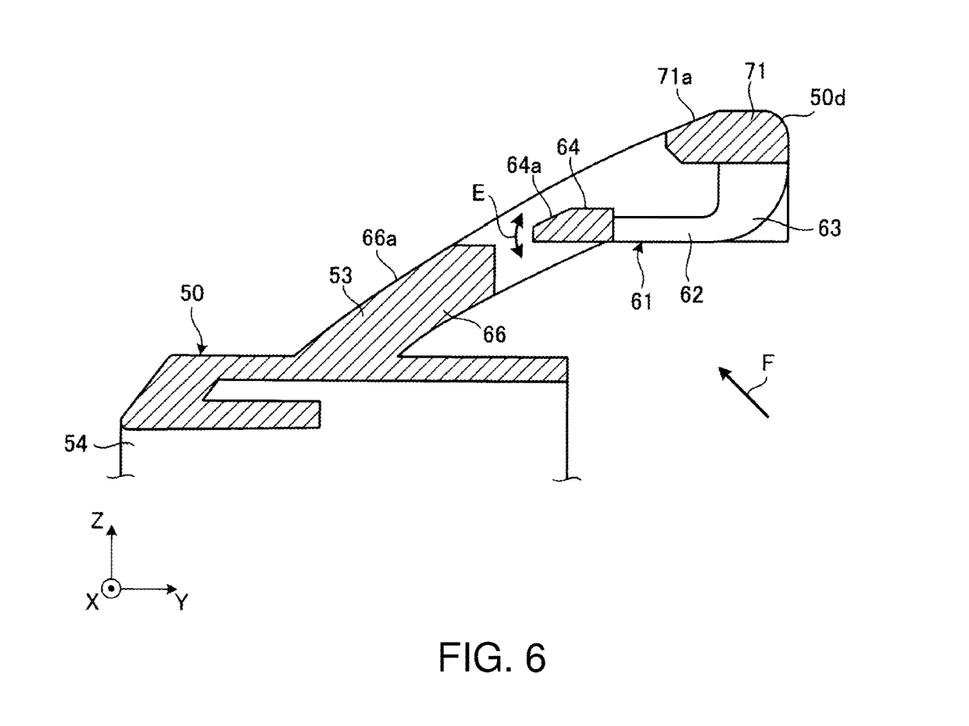
FIG. 6 is a cross-sectional view taken along line VI-VI shown in FIG. 5.

FIG. 5 is an enlarged perspective view of a vicinity of the hole part 61 of the base 50. FIG. 6 is a cross-sectional view taken along line VI-VI shown in FIG. 5.

As illustrated in FIG. 5 and FIG. 6, the hole part 61 includes a substantially L-shaped plate 62 in a side view, and the insertion hole 63 is formed in the plate 62. Specifically, the plate 62 is, for example, formed into a plate shape. After the plate 62 protrudes in the Z-axis negative direction (the vertically downward direction) from the upper end part 50d of the base 50, the plate 62 is configured to bend in the middle and extend in the Y-axis negative direction (in a direction opposite to the installation direction).

The insertion hole 63 into which the insertion member 43 and the base end 42 on the side of the panel 30 can be inserted is formed near a center of the plate 62. A guide part 64 that guides insertion of the insertion member 43 and the base end 42 is formed at a distal end of the plate 62. The guide part 64 includes an inclined surface 64a. The inclined surface 64a is a surface that inclines in the installation direction in the same manner as the inclined surface 44a (refer to FIG. 4) on the side of the panel 30.

The plate 62 configured as described above can be elastically deformed in the up-down direction as shown with an arrow E. As a result, the plate 62 is pushed downward by, for example, the base end 42 when the insertion member 43 and the base end 42 are inserted into the insertion hole 63 so that the plate 62 illustrated in FIG. 6 is elastically deformed from an initial shape. This will be described later with reference to FIG. 8E.

The protrusion part 71 is provided in a position adjacent to a side of the Z-axis positive direction relative to the insertion hole 63 in a vicinity of the upper end part 50d of the base 50. The protrusion part 71 includes an abutting surface 71a. The abutting surface 71a is a surface that abuts on the back surface 30b of the panel 30, for example, when the protrusion part 71 is sandwiched and positioned between the insertion member 43 on the side of the panel 30 and the back surface 30b of the panel 30. Therefore, the abutting surface 71a abuts on the back surface 30b of the panel 30 and is configured to correspond to the curved part 33.

Furthermore, the base 50 includes a rib 66. The rib 66 is a part of the curved part 53 and is configured to abut on the back surface 30b of the panel 30, for example, in a state in which the panel 30 is installed on the base 50.

Therefore, the rib 66 includes an abutting surface 66a and the abutting surface 66a abuts on the back surface 30b of the panel 30 and is configured to correspond to the curved part 33 in the same manner as the abutting surface 71a of the protrusion part 71. As a result, since the movement of the panel 30 in the front direction (the Y-axis positive direction) is controlled by the rib 66, it is possible to position and fix the panel 30 relative to the base 50 in the front direction. This will be described later with reference to FIG. 8F.

Figure 7:
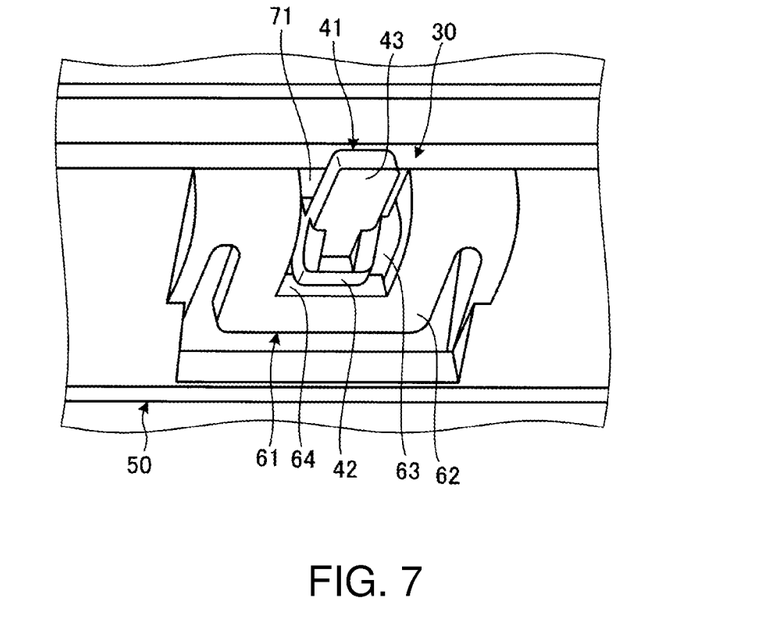
FIG. 7 is an enlarged perspective view of the base on which the panel is installed.

The panel 30 is installed on the base 50 configured as described above. FIG. 7 is an enlarged perspective view when viewed from an arrow F in FIG. 6, of the base 50 on which the panel 30 is installed.

As illustrated in FIG. 7, the insertion member 43 and the base end 42 of the claw 41 are inserted into the insertion hole 63 of the hole part 61, the protrusion part 71 is sandwiched and positioned between the insertion member 43 and the back surface 30b (not seen in FIG. 7) of the panel 30 and the base end 42 of the claw 41 is locked in the insertion hole 63, so that the panel 30 is installed on the base 50.

<3. Method of Assembling Panel Apparatus>

Figure 8A:
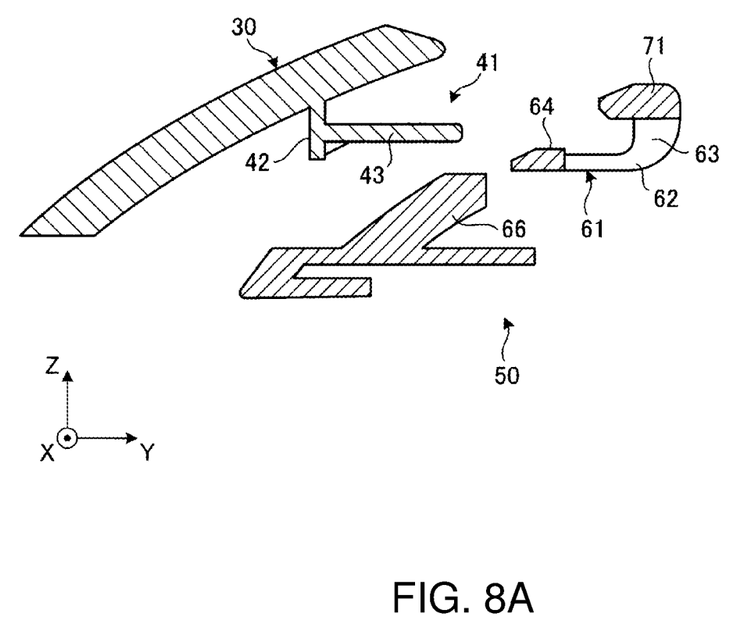
FIG. 8A is a diagram to explain a method of assembling the panel apparatus.

Next, the method of assembling the panel apparatus 20 by installing the panel 30 on the base 50 will be described with reference to FIG. 8A to FIG. 8 F. FIG. 8A to FIG. 8F are diagrams to explain the method of assembling the panel apparatus 20.

FIG. 8A to FIG. 8F show only components necessary for explanation of the method of assembling the panel apparatus 20. Assembly of the panel apparatus 20 described below is executed by, for example, a worker or a working robot that is not illustrated.

First, as illustrated in FIG. 8A, the panel 30 is placed so as to face the base 50. Specifically, the claw 41 of the panel 30 is placed so as to face the hole part 61 and the like of the base 50.

Figure 8B:
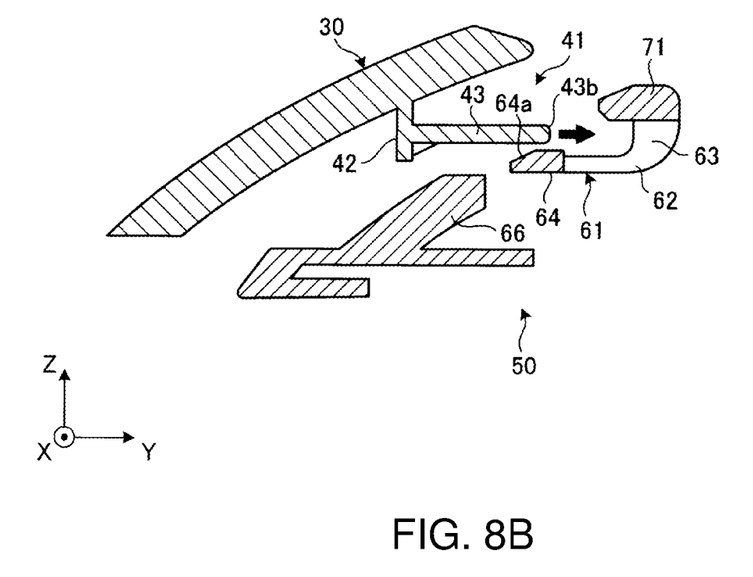
FIG. 8B is a diagram to explain the method of assembling the panel apparatus.

Subsequently, as illustrated in FIG. 8B, the panel 30 is moved toward the base 50, in other words, is moved in the Y-axis positive direction that is the installation direction. The panel 30 is moved while a distal end part 43b of the insertion member 43 of the claw 41 reaches the guide part 64 of the hole part 61 on the side of the base 50 and is guided by the guide part 64.

Since the inclined surface 64a is provided on the guide part 64, for example, even if the panel 30 is moved to a position that is slightly lower than a specified position illustrated in FIG. 8B, the insertion member 43 becomes abutting on the inclined surface 64a. When the insertion member 43 abuts on the inclined surface 64a, the panel 30 can be moved upward along the inclined surface 64a. Thus, it is possible to return the panel 30 to the specified position.

Figure 8C:
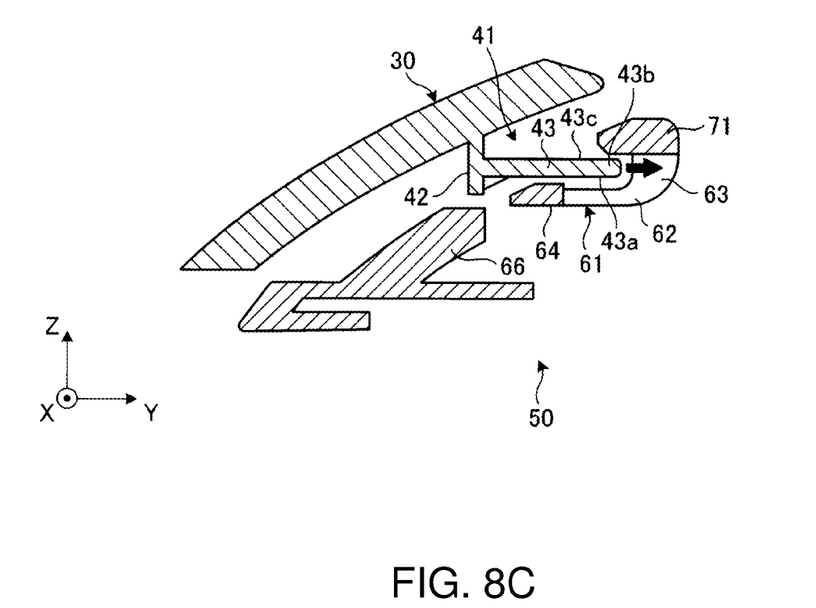
FIG. 8C is a diagram to explain the method of assembling the panel apparatus.

Subsequently, as illustrated in FIG. 8C, the distal end part 43b reaches the protrusion part 71 while the insertion member 43 of the claw 41 is inserted into the insertion hole 63 of the hole part 61. As a result, the protrusion part 71 is positioned on a side of an upper surface 43c of the insertion member 43 while the guide part 64 is positioned on a side of the lower surface 43a of the insertion member 43. Therefore, the panel 30 is moved in the installation direction while the movement of the panel 30 in the up-down direction is controlled by the guide part 64 and the protrusion part 71. Thus, it is possible to surely insert the insertion member 43 into the insertion hole 63 the hole part 61.

Figure 8D:
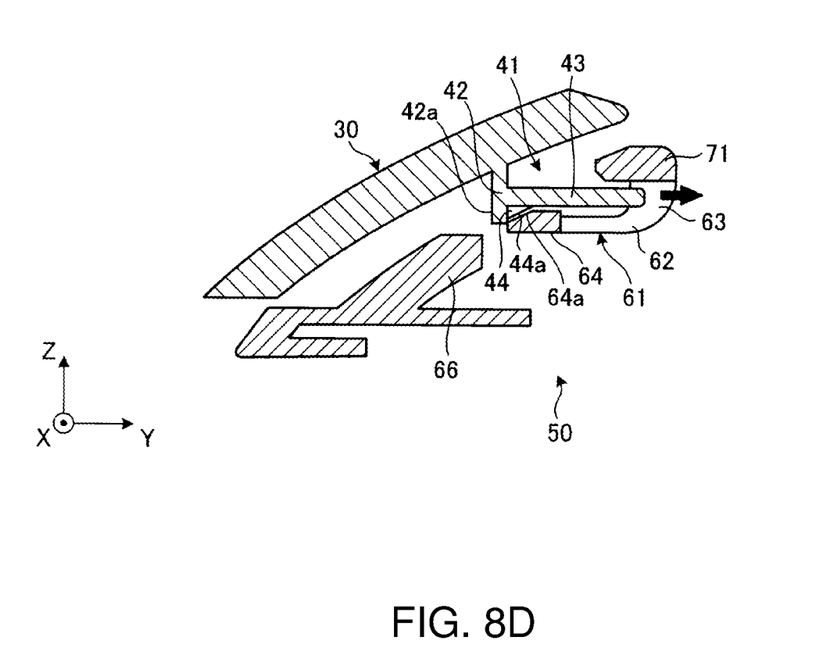
FIG. 8D is a diagram to explain the method of assembling the panel apparatus.

Subsequently, as illustrated in FIG. 8D, since the inclined surface 44a of the inclined part 44 on the side of the panel 30 abuts on the inclined surface 64a of the guide part 64, the inclined part 44 and the base end 42 of the panel 30 gradually push the plate 62 downward.

Figure 8E:
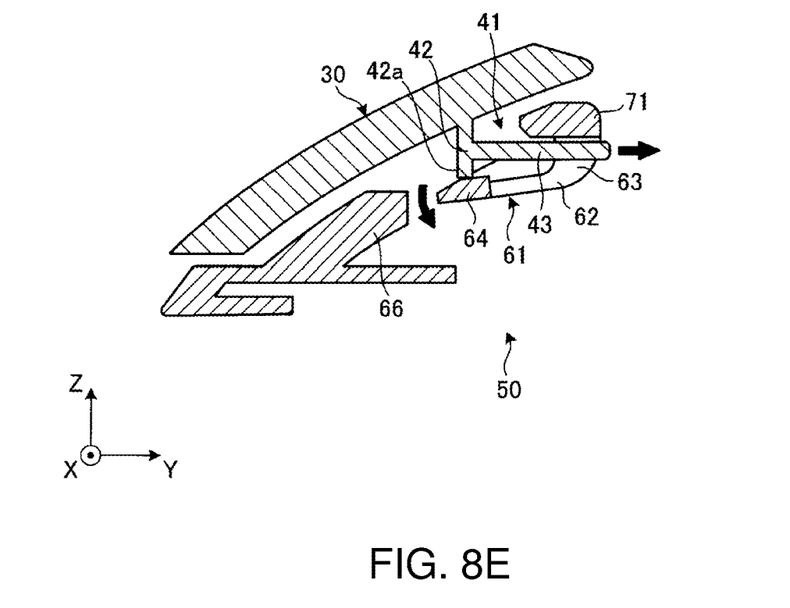
FIG. 8E is a diagram to explain the method of assembling the panel apparatus.

Subsequently, as illustrated in FIG. 8E, the plate 62 is pressed by the base end 42 when the insertion member 43 and the base end 42 are inserted into the insertion hole 63 so that the plate 62 is elastically deformed from the initial shape. At this time, although a force to move the base 50 downward is applied due to elastic deformation of the plate 62, the protrusion part 71 of the base 50 is pressed to the insertion member 43 so as to function as a stopper. Thus, it is possible to prevent the base 50 from moving downward.

Figure 8F:
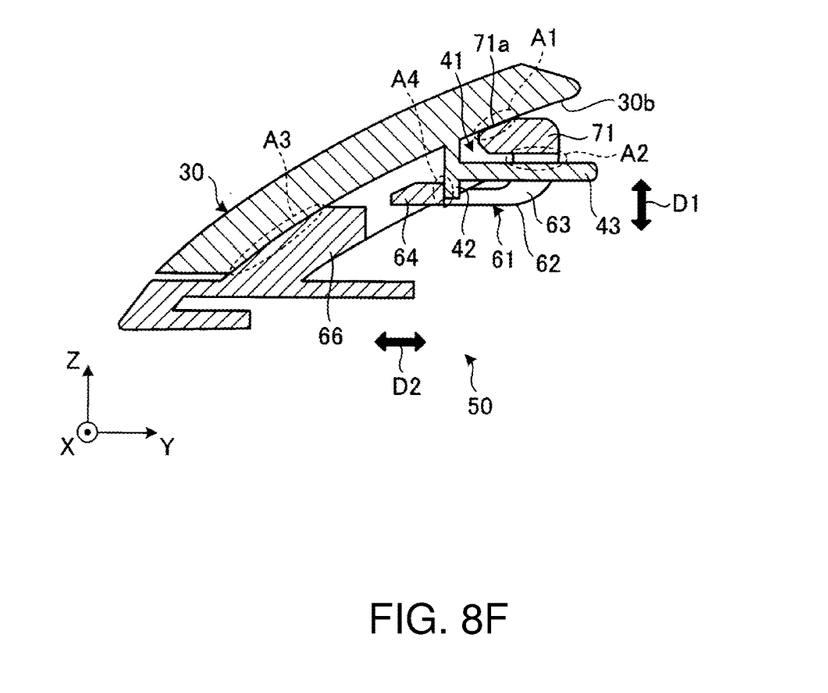
FIG. 8F is a diagram to explain the method of assembling the panel apparatus.

As illustrated in FIG. 8F, when the panel 30 is further moved in the Y-axis positive direction and insertion of the insertion member 43 and the base end 42 is completed, the plate 62 is released from pressure of the base end 42 and returns to the initial shape so that the base end 42 is locked in the insertion hole 63. As a result, the panel 30 is installed on the base 50 and assembly of the panel apparatus 20 is completed.

As described above, in this embodiment, the plate 62 is elastically deformed by the pressure of the base end 42, and returns to the initial shape at a point of time at which the base end 42 reaches the insertion hole 63 and the plate 62 is released from the pressure of the base end 42. Therefore, it is possible to surely lock the base end 42 in the insertion hole 63.

Furthermore, in a state in which the panel 30 is installed on the base 50, the protrusion part 71 is sandwiched and positioned between the insertion member 43 and the back surface 30b of the panel 30. In a state in which the panel 30 is installed on the base 50, the abutting surface 71a of the protrusion part 71 abuts on the back surface 30b of the panel 30. As a result, in positions surrounded by closed curves A1 and A2 with broken lines in FIG. 8F, the movement of the panel 30 in the up-down direction (refer to the arrow D1) and the front direction (the Y-axis positive direction) is controlled.

In a state in which the panel 30 is installed on the base 50, the abutting surface 66a of the rib 66 abuts on the back surface 30b of the panel 30. As a result, in a position surrounded by a closed curve A3 with a broken line in FIG. 8F, the movement of the panel 30 in the front direction is controlled.

In a state in which the panel 30 is installed on the base 50, the base end 42 of the claw 41 is locked in the insertion hole 63. As a result, in a position surrounded by a closed curve A4 with a broken line in FIG. 8F, the movement of the panel 30 in the back direction (the Y-axis negative direction) is controlled.

Therefore, in this embodiment, it is possible to position and fix the panel 30 relative to the base 50 in the up-down direction (refer to the arrow D1) and the front-back direction (refer to the arrow D2).

In the above, the panel apparatus 20 is assembled by moving the panel 30 relative to the base 50, but the invention is not limited thereto. For example, the panel apparatus 20 may be assembled by moving the base 50 relative to the panel 30.

As described above, the panel apparatus 20 according to the embodiment includes the base 50 and the panel 30 that is installed on the base 50. The panel 30 includes: the claw 41 that includes the base end 42 that protrudes from the back surface 30b of the panel 30 in the different direction from the installation direction to the base 50; and the insertion member 43 that protrudes from the base end 42 in the installation direction to the base 50.

The base 50 includes the hole part 61 that has the insertion hole 63 into which the insertion member 43 can be inserted and the protrusion part 71 that is provided adjacent to the insertion hole 63. The insertion member 43 and the base end 42 of the claw 41 are inserted into the insertion hole 63 of the hole part 61 so that the protrusion part 71 is sandwiched and positioned between the insertion member 43 and the back surface 30b of the panel 30, and the base end 42 is locked in the insertion hole 63. Thus, the panel 30 is installed on the base 50. As a result, it is possible to improve positioning capability of the panel 30 relative to the base 50.

In this embodiment, since the panel 30 is positioned and fixed relative to the base 50 in the up-down direction and the front-back direction, for example, even if the panel 30 is warped by residual stress caused during injection molding, it is possible to install the panel 30 on the base 50 while lifting of the panel 30 relative to the base 50 is suppressed.

In this embodiment, since the panel 30 is installed on the base 50 in a configuration in which the claw 41 is formed on the panel 30 and the hole part 61 is formed in the base 50, it is cost-advantageous compared to a case in which a member for installation such as a screw or an adhesive tape is used.

The base 50 and the panel 30 according to this embodiment are mounted on the vehicle 1. Therefore, even if an external force such that the panel 30 is lifted from the base 50 is applied due to vibration during vehicle driving or product variation of peripheral parts or the like, the movement of the panel 30 is controlled by the configuration described above. Thus, it is possible to suppress rattles of the panel 30.

In the embodiment described above, the panel apparatus 20 and the like have been described using expressions such as "X-axis direction", "Y-axis direction" and "Z-axis direction". The "X-axis direction", the "Y-axis direction" and the "Z-axis direction" mean "X-axis direction", "Y-axis direction" and "Z-axis direction", respectively, in a state in which the panel apparatus 20 and the like are installed on the vehicle 1 as shown in the figure, and the directions are not limited thereto.

In the above, description has been made by taking, as an example, a case where the panel apparatus 20 is applied to the on-vehicle device, but the invention is not limited thereto. For example, the panel apparatus 20 may be applied to other types of products including a printer, or home electric appliances such as washing machine or the like.

Further effects and a modification example may be easily derived by a person having ordinarily skilled in the art. For that reason, a broader aspect of the present invention is not limited to specific details and representative embodiments as having been described above. Accordingly, various changes may be made without departing from a spirit or a scope of a general inventive concept defined by attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A panel apparatus comprising:
    a base; and
    a panel that is removably installed to the base, the panel including a claw having (i) a base end that protrudes from a back surface of the panel in a different direction from an installation direction of the panel to the base, and (ii) an insertion member that protrudes from the base end in the installation direction, the installation direction being a direction in which the panel is moved when the panel is installed to the base, wherein:
    the base includes an insertion hole into which the insertion member of the panel is inserted, and a protrusion located adjacent to the insertion hole, and
    when the insertion member and the base end of the claw are inserted into the insertion hole to install the panel to the base, the protrusion of the base is sandwiched and positioned between the insertion member and the back surface of the panel, the protrusion of the base abuts the back surface of the panel and the base end of the claw is locked in the insertion hole.

2. The panel apparatus according to claim 1,
    wherein the base includes an elastically deformable plate in which the insertion hole is located, and the plate is elastically deformed from an initial shape when the plate is pressed by the base end of the claw when the insertion member and the base end of the claw are being inserted into the insertion hole, and when insertion of the insertion member and the base end of the claw into the insertion hole is completed, the plate is no longer pressed by the base end and returns to the initial shape to lock the base end in the insertion hole.

3. The panel apparatus according to claim 1, wherein the base includes a rib that abuts on the back surface of the panel in a state in which the panel is installed on the base.

4. The panel apparatus according to claim 1, wherein at least a portion of the panel is curved so as to protrude toward a front surface side of the panel, and the claw is provided to a back surface of the at least a portion of the panel.

5. The panel apparatus according to claim 1, wherein the claw is provided in a vicinity of an opening of the panel.

6. The panel apparatus according to claim 1, wherein the base and the panel are mounted on a vehicle.

7. A method of assembling a panel apparatus that includes a base and a panel that is removably installed on the base, the method comprising the steps of:
  placing the panel, which includes a claw having (i) a base end that protrudes from a back surface of the panel in a different direction from an installation direction of the panel to the base, and (ii) an insertion member that protrudes from the base end in the installation direction, the installation direction being a direction in which the panel is moved when the panel is installed on the base, so as to face the base, which includes an insertion hole into which the insertion member of the panel can be inserted and a protrusion located adjacent to the insertion hole, and
  installing the panel on the base by inserting the insertion member and the base end of the claw into the insertion hole of the base so that (1) the protrusion of the base is sandwiched and positioned between the insertion member and the back surface of the panel, (2) the protrusion of the base abuts the back surface of the panel, and (3) the base end of the claw is locked in the insertion hole.

8. A panel apparatus comprising:
  a base; and
  a panel that is removably installed to the base, the panel including a claw having (i) a base end that protrudes from a back surface of the panel in a different direction from an installation direction of the panel to the base, and (ii) an insertion member that protrudes from the base end in the installation direction, the installation direction being a direction in which the panel is moved when the panel is installed to the base, wherein:
  the base includes an insertion hole into which the insertion member of the panel is inserted, and a protrusion located adjacent to the insertion hole;
  when the insertion member and the base end of the claw are inserted into the insertion hole to install the panel to the base, the protrusion of the base is sandwiched and positioned between the insertion member and the back surface of the panel, and the base end of the claw is locked in the insertion hole;
  the base includes an elastically deformable plate in which the insertion hole is located;
  the plate is elastically deformed from an initial shape when the plate is pressed by the base end of the claw when the insertion member and the base end of the claw are being inserted into the insertion hole; and
  when insertion of the insertion member and the base end of the claw into the insertion hole is completed, the plate is no longer pressed by the base end and returns to the initial shape to lock the base end in the insertion hole.

9. The panel apparatus according to claim 8, wherein the base includes a rib that abuts on the back surface of the panel in a state in which the panel is installed on the base.

10. The panel apparatus according to claim 8, wherein:
  at least a portion of the panel is curved so as to protrude toward a front surface side of the panel; and
  the claw is provided to a back surface of the at least a portion of the panel.

11. The panel apparatus according to claim 8, wherein the claw is provided in a vicinity of an opening of the panel.

12. The panel apparatus according to claim 8, wherein the base and the panel are mounted on a vehicle.

13. A panel apparatus comprising:
  a base; and
  a panel that is removably installed to the base, the panel including a claw having (i) a base end that protrudes from a back surface of the panel in a different direction from an installation direction of the panel to the base, and (ii) an insertion member that protrudes from the base end in the installation direction, the installation direction being a direction in which the panel is moved when the panel is installed to the base, wherein:
  the base includes an insertion hole into which the insertion member of the panel is inserted, and a protrusion located adjacent to the insertion hole;
  when the insertion member and the base end of the claw are inserted into the insertion hole to install the panel to the base, the protrusion of the base is sandwiched and positioned between the insertion member and the back surface of the panel, and the base end of the claw is locked in the insertion hole; and
  the base includes a rib that abuts on the back surface of the panel in a state in which the panel is installed on the base.

14. The panel apparatus according to claim 13, wherein:
  at least a portion of the panel is curved so as to protrude toward a front surface side of the panel; and
  the claw is provided to a back surface of the at least a portion of the panel.

15. The panel apparatus according to claim 1, wherein the claw is provided in a vicinity of an opening of the panel.

16. The panel apparatus according to claim 1, wherein the base and the panel are mounted on a vehicle.

* * * * *